United States Patent [19]

Kassai et al.

[11] Patent Number: 5,429,419
[45] Date of Patent: Jul. 4, 1995

[54] CHILD SAFETY SEAT FOR AUTOMOBILE

[75] Inventors: Kenzou Kassai; Ichiro Onishi, both of Osaka, Japan

[73] Assignee: Aprica Kassai Kabushikikaisha, Osaka, Japan

[21] Appl. No.: 255,165

[22] Filed: Jun. 7, 1994

[30] Foreign Application Priority Data

Jun. 16, 1993 [JP] Japan .................................. 5-144979

[51] Int. Cl.⁶ ..................... B60R 21/00; B60R 21/12; B60R 22/10; B60N 2/26
[52] U.S. Cl. ................... 297/467; 297/482; 297/488; 297/256.13
[58] Field of Search ............ 297/467, 482, 488, 256.15

[56] References Cited

U.S. PATENT DOCUMENTS

| | | | |
|---|---|---|---|
| 4,660,889 | 4/1987 | Anthony et al. | 297/467 |
| 4,880,277 | 11/1989 | Takahashi et al. | |
| 4,927,211 | 5/1990 | Bolcerek | 297/467 |
| 4,984,849 | 1/1991 | Rist | 297/482 |
| 5,161,855 | 11/1992 | Harmon | |

FOREIGN PATENT DOCUMENTS

| | | |
|---|---|---|
| 0545185 | 6/1993 | European Pat. Off. |
| 98802180 | 9/1988 | Germany |
| 2072489 | 10/1981 | United Kingdom |

*Primary Examiner*—Peter R. Brown
*Assistant Examiner*—Anthony Barfield
*Attorney, Agent, or Firm*—W. G. Fasse; W. F. Fasse

[57] ABSTRACT

In a child safety seat for use in an automobile, a cushion member is provided along back surfaces of a crotch belt upwardly extending from a seat surface. A buckle is mounted on a free end of said crotch belt. Due to the rigidity of the cushion member, the crotch belt is made self-supporting, so that the crotch belt holds the buckle in the proper position and orientation Thus, a shoulder belt can be easily attached to or detached from the buckle. Moreover, the crotch belt is made more comfortable for the child.

10 Claims, 4 Drawing Sheets

CHILD SAFETY SEAT FOR AUTOMOBILE

BACKGROUND OF THE INVENTION

1. Field of the Invention

The present invention relates to a child safety seat for an automobile. The safety seat is to be mounted on an original seat of an automobile for safely seating a child in the automobiles. More particularly, the invention relates to an improvement of a belt which is provided on such a child safety seat for an automobile for holding the body of the child.

2. Description of the Background Art

In general, a child safety seat for an automobile comprises a crotch belt extending upwardly from a seat surface and between the thighs of a seated child and shoulder belts which extend from a backrest and pass along the shoulders of the child. A buckle is mounted on an end of the crotch belt so that the shoulder belts are detachably coupled to the buckle. The safety seat may also comprise hip belts that pass along the hips of the child, and are also detachably coupled to the buckle. The hip belts may be integrally formed with the shoulder belts.

The aforementioned shoulder belts and the like are coupled to the buckle after the child is seated on the child safety seat for an automobile. The shoulder belts and the like are detached from the buckle when the child is helped out of the seat.

Before the child is seated on the aforementioned child safety seat, the crotch belt is in an arbitrary state on the seat surface, for example. In other words, the crotch belt may be bent or twisted in any shape. Therefore, the buckle mounted on the end of the crotch belt is in an arbitrary position and an arbitrary state on the seat surface, for example, while its front and back sides arbitrarily face in any direction.

When the child is seated in this state, the crotch belt and the buckle may be located under the buttocks of the child, which is uncomfortable for the child and inconvenient for the person who is seating the child. In order to avoid this, the user must separate the crotch belt and the buckle from the seat surface before seating the child, so that the same are not located under its buttocks. If the crotch belt and the buckle are not first removed from the seat and they become located under the buttocks of the child, then the user must draw out the buckle from under the child's buttocks by pulling the crotch belt. Such operations are relatively troublesome.

Further, the user must properly orient the front and back sides of the buckle in front of the body of the child, to be able to couple the shoulder belts and the like to the buckle. However, the crotch belt carrying the buckle is so easily twisted, which reverses the buckle, so that the user simply holding the buckle may have to turn over the buckle for coupling the shoulder belts thereto. In this case, the user must take care to turn over the buckle in the proper direction for untwisting the crotch belt to its original or proper state. This also complicates the operation of coupling the shoulder belts to the buckle.

Even if the buckle is in a correct direction, the user may inadvertently couple the shoulder belts to the buckle when the crotch belt is in a twisted state. In this case, the crotch belt feels uncomfortable between the thighs of the seated child. In addition, the crotch belt may injure the child when an impact is applied to the automobile by abrupt braking or the like.

The crotch belt is adapted to cooperate with the shoulder belts to hold the body of the child in the safety seat when an impact is applied to the automobile by abrupt braking or the like. However, it is preferably to prevent the crotch belt from pinching the child when such an impact occurs.

SUMMARY OF THE INVENTION

Accordingly, an object of the present invention is to provide a child safety seat for an automobile, which can solve the aforementioned problems relating to twisting of the crotch belt and the like, and satisfy the aforementioned requirement of avoiding pinching and the like.

The present invention is directed to a child safety seat for an automobile comprising a crotch belt extending upwardly from a seat surface and between the thighs of a seated child a buckle mounted on an end of the crotch belt, and a shoulder belt which passes along the shoulder of the child to be detachably coupled to the buckle. In order to solve the aforementioned technical problems, a cushion member is provided along back surfaces of the crotch belt and the buckle, with a sufficient rigidity for making the crotch belt self-supporting, i.e. able to stand upright by itself and to resist twisting.

Thus, due to the provision of the cushion member, the crotch belt is maintained in a self-sustaining or self-supporting state independently of the seat surface, while the buckle is maintained in a correct position and a correct state or orientation by the cushion member.

According to the present invention, therefore, it is possible to avoid the aforementioned complicated operations of lifting or clearing the crotch belt and the buckle from the seat surface before seating the child or alternatively, drawing out the crotch belt and the buckle from under the buttocks of the child, and untwisting the crotch belt so that the buckle is oriented properly when the child is simply seated on the inventive child safety seat, the crotch belt is naturally located between the child's thighs and the buckle is properly positioned and oriented in front of the child. Even if the body of the child as seated hits the buckle or the crotch belt, the chance of pinching or injuring the child is reduced because the cushion member will be deformed to reduce the impact which is applied to the child. Even if the cushion member is temporarily deformed, the same returns to its original state because of its elasticity, when the child is seated in the proper position. Thus, the crotch belt and the buckle are restored to proper positions.

As hereinabove described, the buckle is maintained in a proper position and a proper orientation after the child is seated, whereby the shoulder belt can be easily coupled to the buckle.

Further, the cushion member is positioned along the back surfaces of the crotch belt and the buckle to provide safety cushioning for the child. When an impact is applied to the automobile by abrupt braking or the like, the child may be thrown forward against the crotch belt and buckle. In such a situation, there may be a chance that the crotch belt and the buckle may nip or pinch the body of the child, but the present cushion member sufficiently relieves or cushion this impact.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
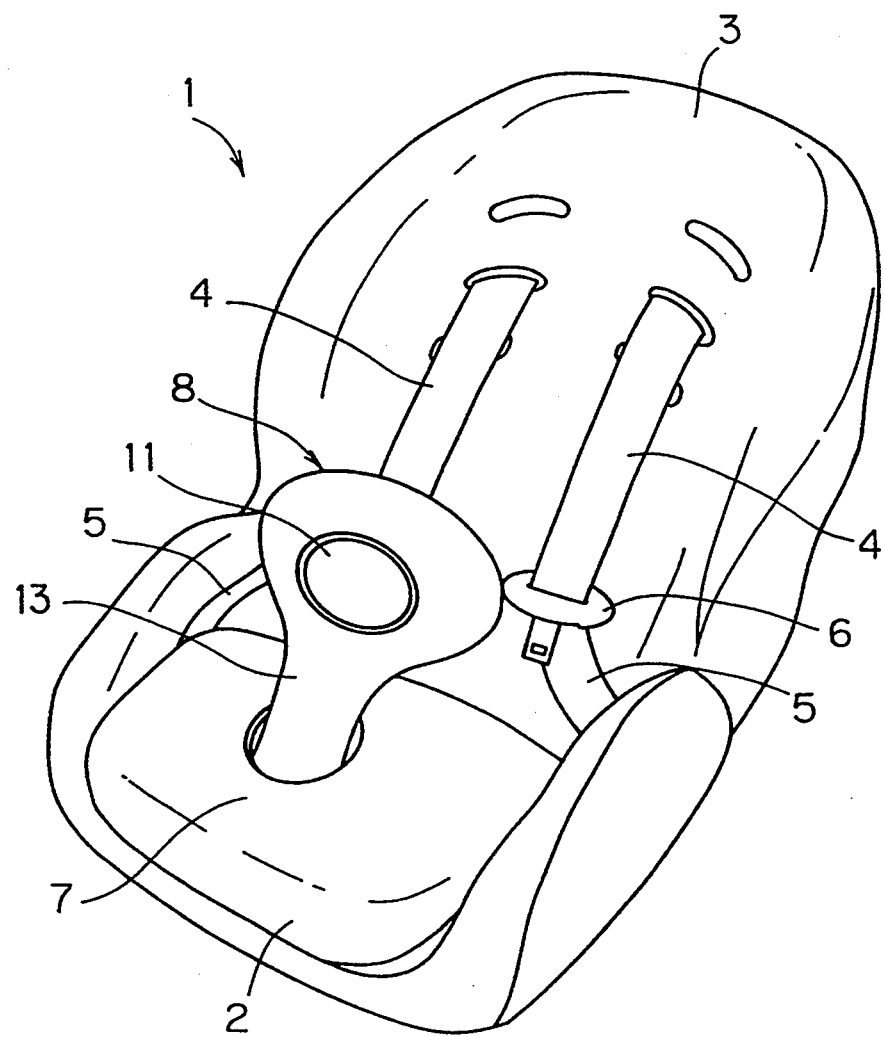
FIG. 3 is a perspective view showing a child safety seat 1 for an automobile comprising the buckle assembly 8 shown in FIG. 1.
Figure 4:
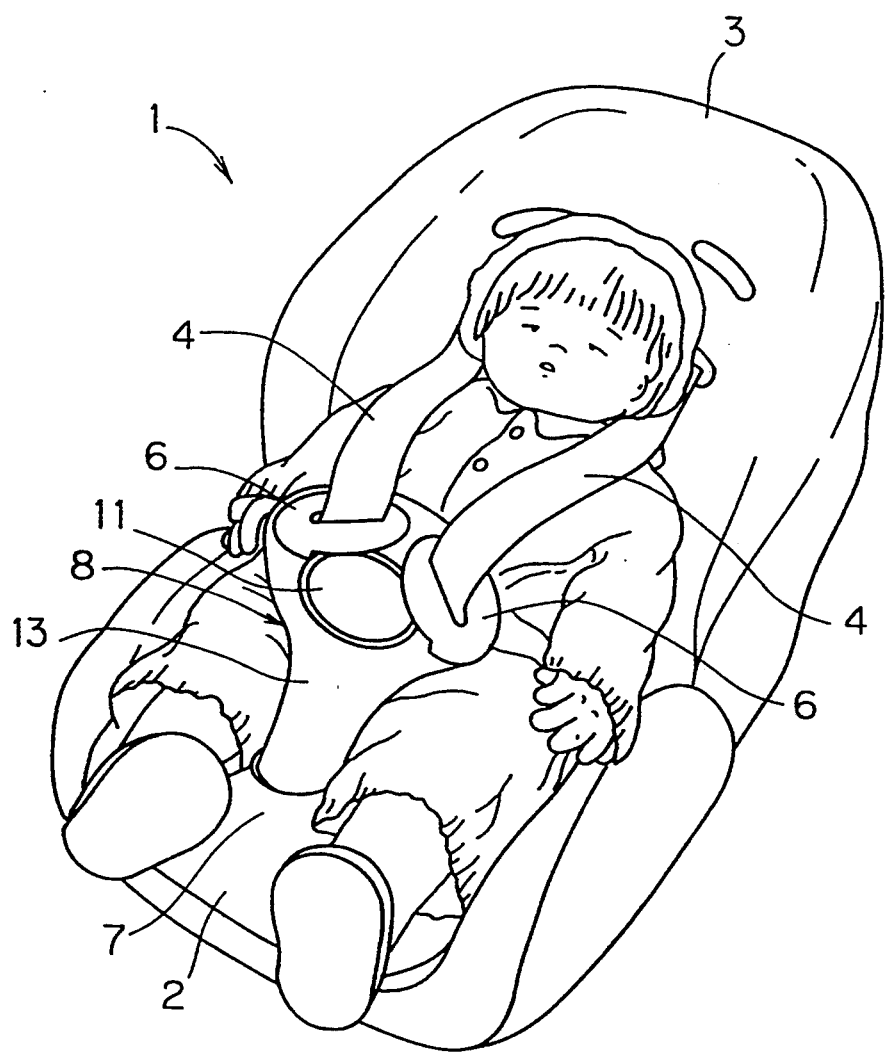
FIG. 4 is a perspective view showing a child seated on the child safety seat 1 for an automobile shown in FIG. 3.

FIGS. 3 and 4 are perspective views showing a child safety seat 1 for an automobile according to an embodiment of the present invention. FIG. 3 independently shows the safety seat 1, and FIG. 4 shows a child seated on this safety seat 1.

Figure 1:
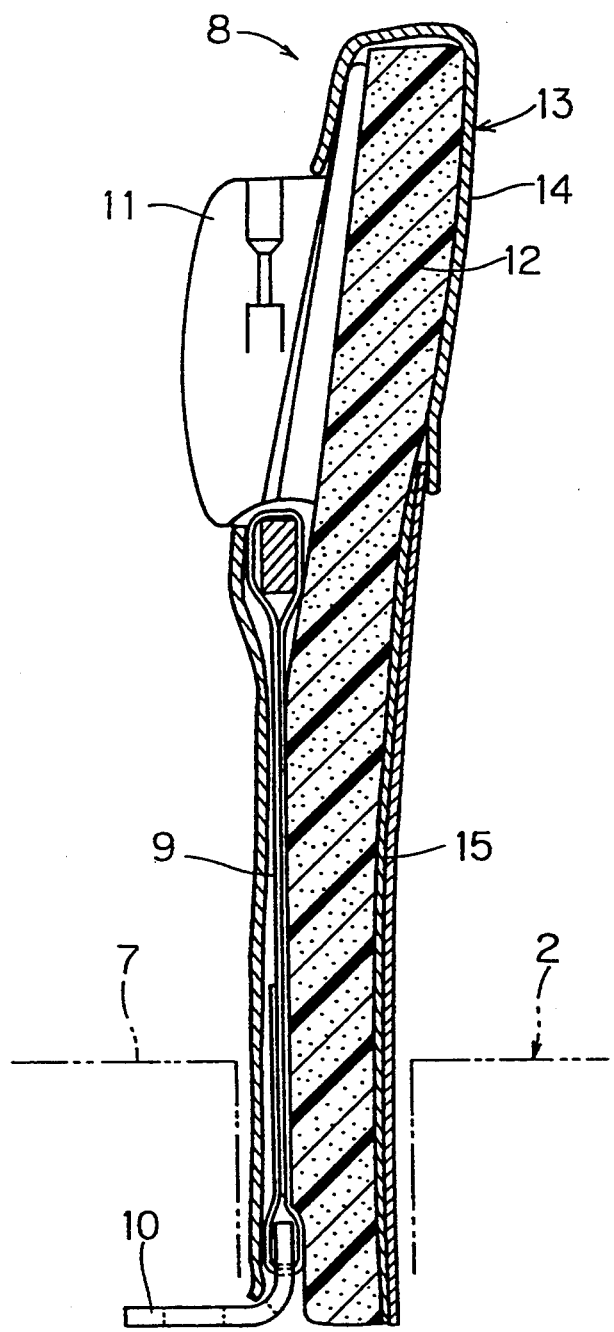
FIG. 1 is a sectional view showing a buckle assembly 8 provided in a child safety seat for an automobile according to an embodiment of the present invention.

The safety seat 1 comprises a seat 2 and a backrest 3. Shoulder belts 4 are drawn out from the backrest 3 to be passed along the shoulders of the child. According to this embodiment, lap or hip belts 5 are provided by the same belts as the shoulder belts 4. The belts providing the shoulder and hip belts 4 and 5 are inserted in tongue plates 6. A buckle assembly 8 projects upwardly from a seat surface 7 which is formed on an upper surface of the seat 2. FIG. 1 is a sectional view showing this buckle assembly 8.

As shown in FIG. 1, the buckle assembly 8 comprises a crotch belt 9 which upwardly extends from the seat surface 7 shown by a phantom line. A lower end of this crotch belt 9 is fixed to the seat 2 by an anchor plate 10. A buckle 11 is mounted on an upper end of the crotch belt 9. As shown in FIG. 4, the aforementioned tongue plates 6 can be detachably coupled to this buckle 11, thereby detachably coupling the shoulder and hip belts 4 and 5 to the buckle 11 and thus to the crotch belt 9.

A cushion member 12 is provided along back surfaces, i.e. child facing surface of the crotch belt 9 and the buckle 11. The cushion member 12 is made of a foam resin, for example, with sufficient rigidity for making the crotch belt 12 self-supporting. The buckle assembly 8 is covered with a flexible cover 13. This cover 13 exposes only a principal part of the buckle 11, to enable the respective attachment and detachment of the tongue plates 6 to and from the buckle 11.

Figure 2:
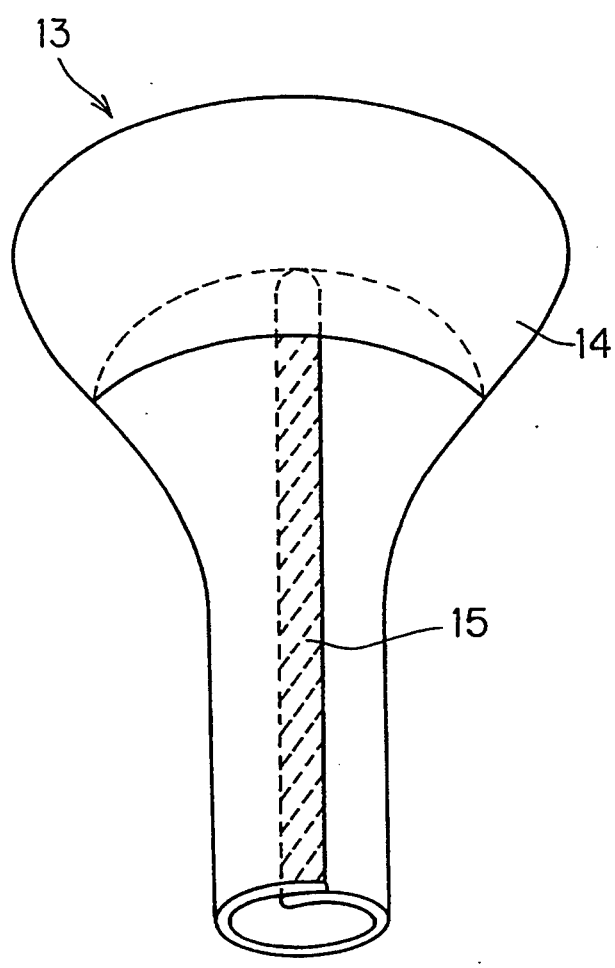
FIG. 2 is a rear elevational view showing a cover 13 for the buckle assembly 8 shown in FIG. 1.

FIG. 2 is a rear elevational view showing the cover 13. The cover 13 comprises a bag 14 covering an upper portion of the cushion member 12 and a base portion of the buckle 11. A downwardly extending tubular portion of the bag 14 has edges that overlap each other on a back side of the cushion member 12 to form an overlapped seam portion 15. The overlapped seam portions 15 are connected with each other by a hook-and-loop type fastener, for example. Thus, the cover 13 can be easily removed to be washed when the same is soiled, for example.

Due to presence of the cushion member 12, the crotch belt 9 is brought into a self-supporting state, whereby the overall buckle assembly 8 is also self-supporting. When the child is seated on this safety seat 1, therefore, the buckle 11 is maintained in front of the child's body in a correct position and orientation. Thus, it is possible to easily selectively attach and detach the tongue plates 6 to and from the buckle 11. Further, the cushion member 12 helps prevent pinching or bruising of the child, which may be cause when an impact is applied to the automobile.

While the present invention has been described with reference to the embodiment shown in the drawings, various modifications within the scope of the present invention also exist.

While the safety seat 1 according to the aforementioned embodiment comprises hip belts 5, integral with shoulder belts 4 for example, the present invention is also applicable to a safety seat not having such hip belts. Alternatively, hip belts may be provided by belts which are independent of the shoulder belts.

As a further example modification, the buckle assembly 8 may omit the cover 13 whereby the cushion member 12 is directly joined to the back surfaces of the crotch belt 9 and the buckle 11.

What is claimed is:

1. A safety seat for a child, suitable for use in an automobile, comprising a seat portion including a seating surface, a backrest, a crotch belt extending upwardly from said seating surface and adapted to be located between the thighs of the child, a buckle mounted on an end of said crotch belt, a shoulder belt extending from said backrest and adapted to be passed along the shoulder of the child and to be detachably coupled to said buckle, and a cushion member arranged along back surfaces of said crotch belt and said buckle, wherein said cushion member is sufficiently rigid that said crotch belt and said cushion member together can stand substantially upright unconstrained by said shoulder belt.

2. The child safety seat in accordance with claim 1, wherein said cushion member comprises foam resin.

3. The child safety seat in accordance with claim 1, further comprising a flexible cover arranged to cover said crotch belt and said cushion member while exposing at least a part of said buckle.

4. The child safety seat in accordance with claim 3, wherein said cover is removably arranged to selectively cover said crotch belt and said cushion member.

5. The child safety seat in accordance with claim 4, wherein said cover comprises a selectively fastenable fastener.

6. The child safety seat in accordance with claim 1, wherein said buckle is attached to an upper end of said crotch belt, and a lower end of said crotch belt is attached to said seat portion.

7. The child safety seat in accordance with claim 6, wherein said crotch belt and said cushion member pass through a hole provided in said seat portion.

8. The child safety seat in accordance with claim 1, further comprising a hip belt attached to said seat and adapted to be passed along the hip of the child and to be detachably coupled to said buckle.

9. The child safety seat in accordance with claim 1, wherein said crotch belt has a sufficient length that said buckle is adapted to be located above the legs of the child.

10. The child safety seat in accordance with claim 1, wherein said cushion member is a one-piece cushion.

* * * * *

UNITED STATES PATENT AND TRADEMARK OFFICE
CERTIFICATE OF CORRECTION

PATENT NO.  : 5,429,419
DATED       : July 4, 1995
INVENTOR(S) : Kassai et al.

It is certified that error appears in the above-identified patent and that said Letters Patent is hereby corrected as shown below:

Title page:
In [56] References Cited, FOREIGN PATENT DOCUMENTS,
        replace "98802180" by --8802180--.

Col. 1, line  9, replace "automobiles." by --automobile.--;
        line 17, after "child" insert --,--.

Col. 2, line  4, replace "preferably" by --preferable--;
        line 17, after "child" insert --,--;
        line 38, replace "properly when" by --properly.  When--.

Col. 3, line 42, replace "surface" by --surfaces,--.

Col. 4, line  5, replace "cause" by --caused--;
        line 18, replace "13" by --13,--.

Signed and Sealed this

Twenty-sixth Day of September, 1995

Attest:

BRUCE LEHMAN

Attesting Officer           Commissioner of Patents and Trademarks